(12) United States Patent
Sato (10) Patent No.: US 10,459,841 B2
(45) Date of Patent: Oct. 29, 2019

(54) INFORMATION PROCESSING APPARATUS, INFORMATION PROCESSING SYSTEM, AND METHOD OF CONTROLLING INFORMATION PROCESSING APPARATUS, CONFIGURED TO FORM RING-SHAPED BUS

(71) Applicant: FUJITSU LIMITED, Kawasaki-shi, Kanagawa (JP)

(72) Inventor: Kenta Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/008,095

(22) Filed: Jun. 14, 2018

(65) Prior Publication Data

US 2019/0018776 A1 Jan. 17, 2019

(30) Foreign Application Priority Data

Jul. 12, 2017 (JP) ................................. 2017-136131

(51) Int. Cl.
| | |
|---|---|
| *G06F 12/0831* | (2016.01) |
| *G06F 13/38* | (2006.01) |
| *G06F 15/80* | (2006.01) |
| *G06F 12/14* | (2006.01) |
| *G06F 13/42* | (2006.01) |

(52) U.S. Cl.
CPC ...... *G06F 12/0831* (2013.01); *G06F 12/1491* (2013.01); *G06F 13/4247* (2013.01); *G06F 15/8015* (2013.01); *G06F 13/38* (2013.01)

(58) Field of Classification Search
CPC ............. G06F 12/0831; G06F 12/1491; G06F 15/8015; G06F 13/16; G06F 13/38
USPC ....... 710/107, 112, 118, 125, 244, 305, 316; 370/400; 709/251; 711/158
See application file for complete search history.

(56) References Cited

U.S. PATENT DOCUMENTS 6,490,630 B1   12/2002 Poon et al.
2008/0016254 A1*  1/2008 Kruger ................ G06F 13/1657
                                                              709/251

(Continued)

FOREIGN PATENT DOCUMENTS

JP          2000-67023          3/2000

*Primary Examiner* — Hong C Kim
(74) *Attorney, Agent, or Firm* — Fujitsu Patent Center (57) ABSTRACT

A first information-processing-apparatus includes a buffer to have entries to store a first request-data received and transmitted to a second information-processing-apparatus, a memory, and a processor coupled to the memory and configured to transmit, to the second information-processing-apparatus, the first request-data and a second request-data to be transmitted to second or third information-processing-apparatus, when a state where a number of entries in which data is stored in the buffer is equal to or larger than a first threshold is continued for a time longer than a first time, and a state where transmissions of first and second request-data to the second information-processing-apparatus are suppressed is continued for a time longer than a second time, change a number of entries usable in the buffer into a second threshold larger than the first threshold, and when the number of entries usable is the second threshold, suppress a transmission of the second request-data.

9 Claims, 11 Drawing Sheets

(56) References Cited

U.S. PATENT DOCUMENTS

| | | | | |
|---|---|---|---|---|
| 2010/0303090 A1* | 12/2010 | Inoue | ............. | H04L 12/42 370/401 |
| 2011/0093644 A1* | 4/2011 | Kruger | ............. | G06F 13/1657 710/316 |
| 2013/0198431 A1* | 8/2013 | Hara | ............. | G06F 13/4063 710/305 |

* cited by examiner

INFORMATION PROCESSING APPARATUS, INFORMATION PROCESSING SYSTEM, AND METHOD OF CONTROLLING INFORMATION PROCESSING APPARATUS, CONFIGURED TO FORM RING-SHAPED BUS

CROSS-REFERENCE TO RELATED APPLICATION

This application is based upon and claims the benefit of priority of the prior Japanese Patent Application 2017-136131, filed on Jul. 12, 2017, the entire contents of which are incorporated herein by reference.

FIELD

The embodiments discussed herein are related to an information processing apparatus, an information processing system, and a method of controlling the information processing apparatus.

BACKGROUND

Figure 11:
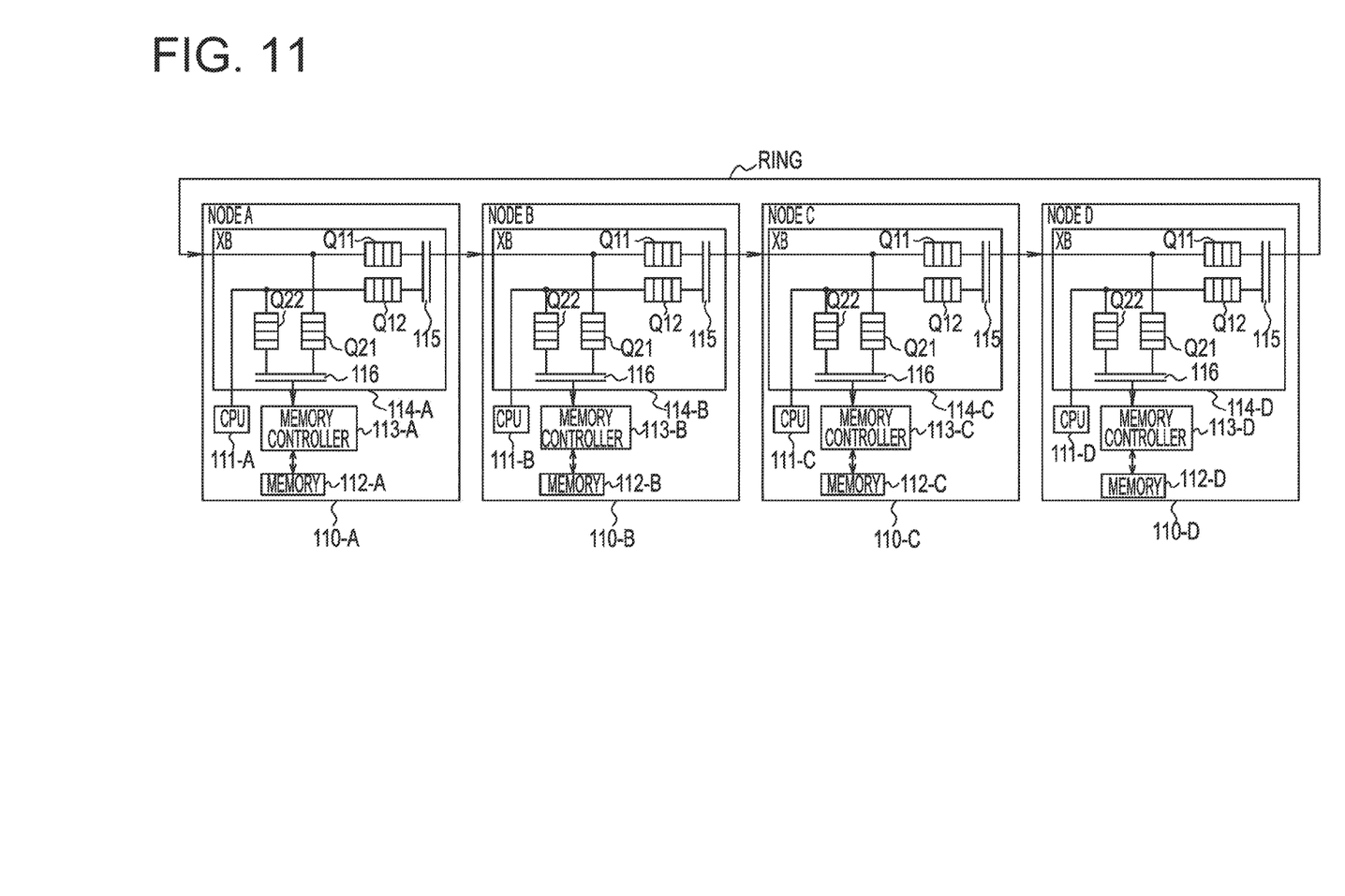
FIG. 11 is a view illustrating an example of a configuration of an information processing system.

FIG. 11 represents an information processing system in which a plurality of nodes (information processing apparatuses) 110 is connected to each other via a ring bus (RING) connecting the plurality of nodes to each other in an annular shape. Each node 110 includes a central processing unit (CPU) 111, a memory 112, a memory controller 113, and a crossbar unit (XB) 114. The CPU 111 performs an arithmetic processing and issues a request as well. According to the received request, the memory controller 113 performs a data writing or a data reading with respect to the memory 112. The crossbar unit (XB) 114 determines a reception destination of a packet such as the request transmitted via the ring bus RING, and controls the transmission of the packet.

The crossbar units (XB) 114 of the nodes are connected to each other in a ring shape, and each node 110 may access the memory 112 of an arbitrary node connected via the ring bus (RING). The crossbar unit (XB) 114 of each node 110 stores a request addressed to (=received by) another node in queues (buffers) Q11 and Q12 which are holding units, causes the request to be arbitrated in an arbitration unit 115, and transmits the request to another node of the next stage. Further, the crossbar unit (XB) 114 stores a request addressed to its own node in queues (buffers) Q21 and Q22, causes the request to be arbitrated in an arbitration unit 116, and transmits the request to the memory controller 113. In this manner, each node 110 receives and processes the request addressed to the own node, and transmits the request not addressed to the own node to another node of the next stage.

Here, in the information processing system having the plurality of nodes 110 connected to each other via the ring bus RING as illustrated in FIG. 11, when a node becomes a busy state and suppresses the reception of a request from a node of the previous stage, the requests are piled up in the node of the previous stage, and finally, a node of the stage next to the node that is the first to have become the busy state also becomes the busy state. As a result, a deadlock occurs.

For example, in a memory access request from the node A 110-A to the node C 110-C illustrated in FIG. 11, when the processing by the memory controller 113-C of the node C 110-C becomes slow and the node B 110-B becomes the busy state, a request of the node A 110-A from another node may not be issued as well. Further, when the node A 110-A becomes the busy state, a request of the node D 110-D from another node may not also be issued and the node D 110-D becomes the busy state so that the deadlock occurs. As described above, in the information processing system having the plurality of nodes 110 connected to each other via the ring bus (RING), the deadlock may occur due to the busy state of a node.

There has been suggested a technology which resolves the circumstance of the deadlock by storing a request in a memory, rather than in a queue, when the circumstance of the deadlock is detected (see, e.g., Japanese Laid-Open Patent Publication No. 2000-067023).

SUMMARY

According to an aspect of the invention, an information processing apparatus as a first information processing apparatus of a plurality of information processing apparatuses configured to form a ring-shaped bus, the information processing apparatus includes a first buffer configured to have entries to store a first request data that is received through the ring-shaped bus and transmitted to a second information processing apparatus of the plurality of information processing apparatuses through the ring-shaped bus, a memory, and a processor coupled to the memory and the processor configured to transmit, to the second information processing apparatus, the first request data stored in the entries of the first buffer and a second request data to be transmitted to the second information processing apparatus or a third information processing apparatus of the plurality of information processing apparatuses when a state where a number of entries in which data is stored in the first buffer is equal to or larger than a first threshold is continued for a time longer than a first time, and a state where transmissions of the first request data and the second request data to the second information processing apparatus are suppressed is continued for a time longer than a second time, change a number of entries usable in the first buffer into a second threshold larger than the first threshold, and when the number of entries usable in the first buffer is the second threshold, suppress a transmission of the second request data to the ring-shaped bus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, descriptions will be made on embodiments of a technology which suppresses an occurrence of a deadlock in an information processing system including a plurality of information processing apparatuses connected to each other via a ring bus, with reference to the accompanying drawings.

First Embodiment

Figure 1:
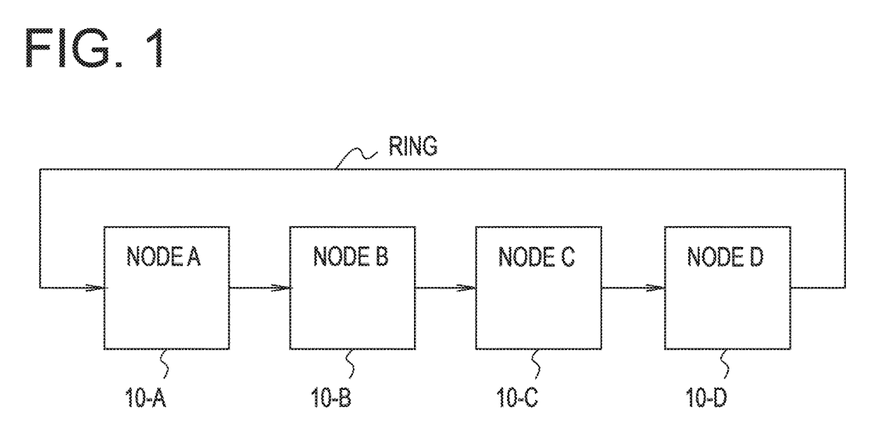
FIG. 1 is a diagram illustrating an example of a configuration of an information processing system according to a first embodiment.
Figure 2:
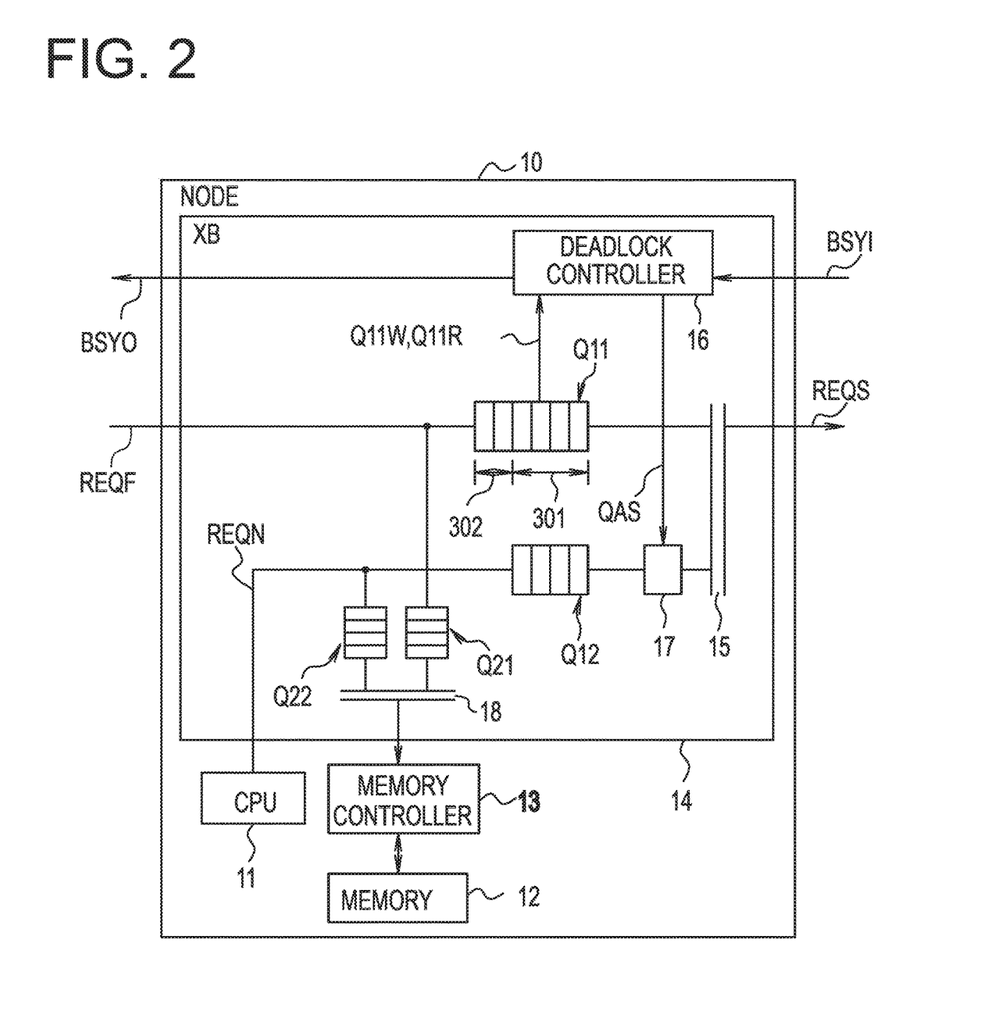
FIG. 2 is a view illustrating an example of a configuration of a node according to the first embodiment.

A first embodiment of the present disclosure will be described. FIG. 1 is a diagram illustrating an example of a configuration of an information processing system according to a first embodiment. The information processing system according to the first embodiment includes nodes 10 which are a plurality of information processing apparatuses connected to each other via a ring bus (RING) connecting the plurality of nodes to each other in an annular shape. FIG. 2 represents an example of an internal configuration of a node 10.

In the present embodiment, a request issued from a node 10 propagates in a single direction (only in one direction). In the present example, it is assumed that the request propagates in the direction of the nodes A, B, C, D, A, B, . . . . However, the direction may be reversed. In addition, while FIG. 1 represents the configuration in which the four nodes 10-A to 10-D are connected to each other via the ring bus (RING), the present disclosure is not limited to the configuration. An arbitrary plurality of nodes may be connected to each other via the ring bus RING.

FIG. 2 is a view illustrating an example of a configuration of each node 10 according to the first embodiment. The node 10 includes the central processing unit (CPU) 11, the memory 12, the memory controller 13, and the crossbar unit (XB) 14. For the convenience of the descriptions, FIG. 2 represents the CPU 11, the memory 12, the memory controller 13, and the crossbar unit (XB) 14 as functional units of the node 10. However, the node 10 may include other functional units.

The CPU 11 performs an arithmetic processing and issues a request. According to the received request, the memory controller 13 performs data write or data read with respect to the memory 12. The crossbar unit (XB) 14 determines a reception destination of a packet such as the request transmitted via the ring bus (RING), and controls the transmission of the packet. Further, the crossbar unit (XB) 14 detects the deadlock state and performs a control to suppress the occurrence of the deadlock.

The crossbar unit (XB) 14 includes four queues (buffers) Q11, Q12, Q21, and Q22 each corresponding to a holding unit, arbitration units (selectors) 15 and 18, a deadlock controller 16, and a suppression unit 17. The requests REQF and REQN input to the crossbar unit (XB) 14 are stored in one of the queues (buffers) Q11, Q12, Q21, and Q22 based on reception destination (issuance destination) information in the requests. Each of the queues (buffers) Q11, Q12, Q21, and Q22 has a plurality of entries.

The remote queue Q11 which is a first holding unit is a queue for storing a request addressed to another node within the request REQF received from another node of the previous (one-stage preceding) stage. The remote queue Q11 outputs a signal Q11W (value "1") when the request is written in the entries, and outputs a signal Q11R (value "1") when the request is read from the entries.

Figure 3:
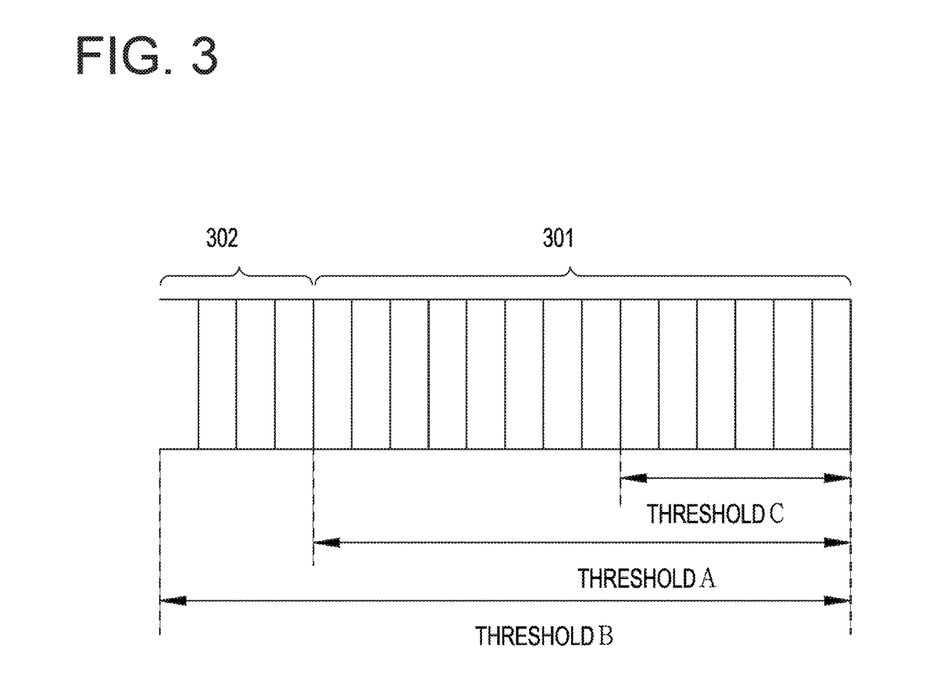
FIG. 3 is a diagram for explaining a remote queue according to the first embodiment.

Here, as illustrated in the example of FIG. 3, the remote queue Q11 has normal entries 301 that are used at the time of an operation in a normal mode and a deadlock resolution mode, and extension entries 302 that are used at the time of an operation in the deadlock resolution mode. That is, in the remote queue Q11, the entries as many as a threshold A which correspond to the normal entries 301 are usable in the normal mode, and the entries as many as a threshold B which correspond to the sum of the normal entries 301 and the extension entries 302 are usable in the deadlock resolution mode. Further, when the number of entries being used becomes less than a threshold C at the time of the operation in the deadlock resolution mode, the deadlock resolution mode is shifted to the normal mode.

The local queue Q12 which is a second holding unit is a queue for storing a request addressed to another node within the request REQN issued by the CPU 11 of the own node. The requests stored in the remote queue Q11 and the local queue Q12 are arbitrated in the arbitration unit 15, and then, transmitted as a request REQS to another node of the next (one-stage succeeding) stage. In addition, when a busy signal BSYI input from another node of the next stage is "1," the arbitration unit 15 suppresses the transmission of the requests to another node of the next stage.

The queue Q21 is a queue for storing a request to the memory 12 of the own node within the request REQF received from another node of the previous stage. The queue Q22 is a queue for storing a request to the memory 12 of the own node within the request REQN issued by the CPU 11 of the own node. The requests stored in the queues Q21 and Q22 are arbitrated in the arbitration unit 18, and then, transmitted to the memory controller 13.

The deadlock controller 16 determines whether the deadlock state occurs, based on the busy signal BSYI input from another node of the next stage and the signals Q11W and Q11R output from the remote queue Q11. When it is determined that the deadlock state occurs, the deadlock controller 16 performs shifting to the deadlock resolution mode and outputs a suppression signal QAS (value "1") for suppressing an issuance of a new request from the own node from the ring bus. In addition, when the number of entries being used in the remote queue Q11 reaches the number of the usable entries, the deadlock controller 16 outputs a busy signal BSYO (value "1") to another node of the previous stage.

According to the suppression signal QAS output from the deadlock controller 16, the suppression unit 17 controls the transmission of the request from the local queue Q12 to the arbitration unit 15. When the value of the suppression signal QAS is "1," the suppression unit 17 suppresses the transmission of the request from the local queue Q12 to the arbitration unit 15, and suppresses the issuance of a new request to the ring bus.

Figure 4:
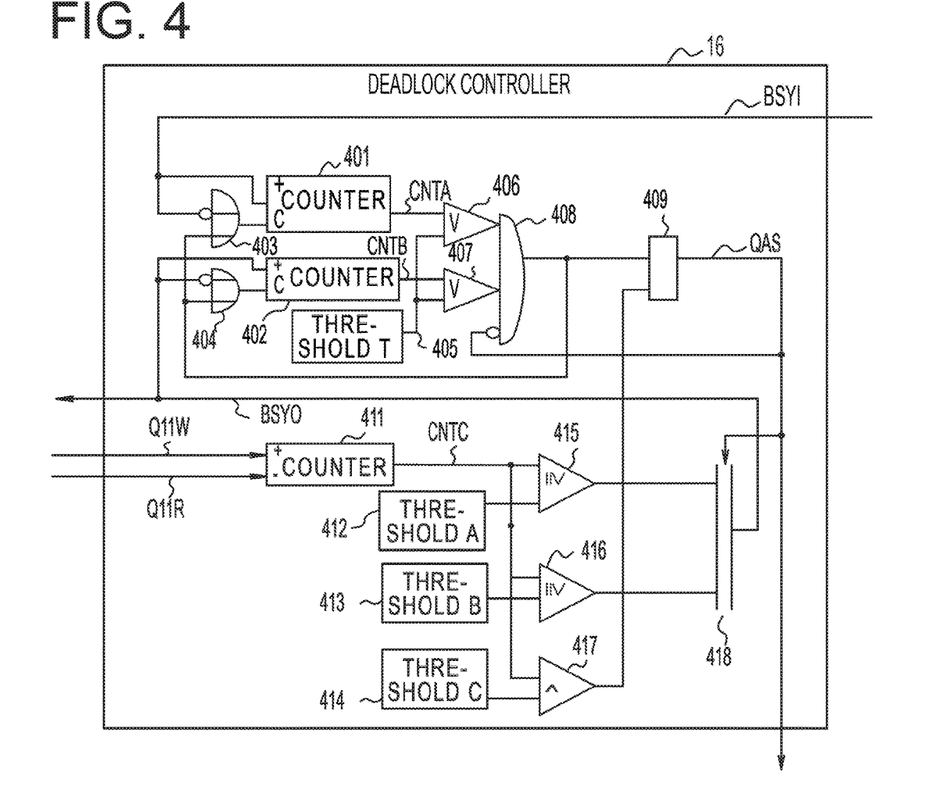
FIG. 4 is a view illustrating an example of a configuration of a deadlock controller according to the first embodiment.

FIG. 4 is a view illustrating an example of a configuration of the deadlock controller 16 according to the first embodiment. The deadlock controller 16 includes counters 401, 402, and 411, logical OR operation circuits (OR circuits)

403 and 404, threshold holding circuits 405, 412, 413, and 414, comparison circuits 406, 407, 415, and 416, a logical AND operation circuit (AND circuit) 408, a flag holding circuit 409, and a selector 418.

The counter 401 counts a time period during which the busy signal BSYI is output (the value is "1") from another node of the next stage, and outputs a count value CNTA. The counter 402 counts a time period during which the busy signal BSYO is output (the value is "1") from the own node, and outputs a count value CNTB. For example, when the busy signal BSYI is "1," the counter 401 increments the count value CNTA by 1 per cycle of a clock signal (not illustrated), and when the output of the OR circuit 403 becomes "1," the counter 401 clears the count value CNTA to "0." In addition, for example, when the busy signal BSYO is "1," the counter 402 increments the count value CNTB by 1 per cycle of a clock signal (not illustrated), and when the output of the OR circuit 404 becomes "1," the counter 402 clears the count value CNTB to "0."

An inverted signal of the busy signal BSYI and the output of the AND circuit 408 are input to the OR circuit 403, and an inverted signal of the busy signal BSYO and the output of the AND circuit 408 are input to the OR circuit 404. Thus, when the busy signal BSYI is "0" or when the output of the AND circuit 408 becomes "1," the counter 401 clears the count value CNTA to "0," and when the busy signal BSYO is "0" or when the output of the AND circuit 408 becomes "1," the counter 402 clears the count value CNTB to become "0."

The threshold holding circuit 405 holds a threshold T. The comparison circuit 406 compares the count value CNTA output from the counter 401 and the threshold T held by the threshold holding circuit 405 with each other, and outputs the comparison result. The comparison circuit 406 outputs "1" when the count value CNTA is larger than the threshold T, and outputs "0" when the count value CNTA is equal to or less than the threshold T. In addition, the comparison circuit 407 compares the count value CNTB output from the counter 402 and the threshold T held by the threshold holding circuit 405 with each other, and outputs the comparison result. The comparison circuit 407 outputs "1" when the count value CNTB is larger than the threshold T, and outputs "0" when the count value CNTB is equal to or less than the threshold T.

The outputs of the comparison circuits 406 and 407 and an inverted signal of the suppression signal QAS are input to the AND circuit 408, and the AND circuit 408 outputs an arithmetic operation result. That is, the AND circuit 408 outputs "1" when both the count values CNTA and CNTB are larger than the threshold T and the suppression signal QAS is "0," and otherwise, outputs "0."

The flag holding circuit 409 holds a flag indicating whether the mode is the deadlock resolution mode, and outputs the suppression signal QAS according to the flag. The flag holding circuit 409 sets the flag to "1" (the mode is the deadlock resolution mode) when the output of the AND circuit 408 becomes "1," and sets the flag to "0" (the mode is not the deadlock resolution mode) when the output of the comparison circuit 417 becomes "1." Further, the flag holding circuit 409 outputs the suppression signal QAS as "1" when the flag is "1," and outputs the suppression signal QAS as "0" when the flag is "0."

Here, the output of the comparison circuit 417 becomes "1" when the number of entries being used in the remote queue Q11 is less than the threshold C. Thus, the flag holding circuit 409 sets the flag to "1" when the suppression signal QAS is "0" and both the count values CNTA and CNTB become larger than the threshold T, and sets the flag to "0" when the number of entries being used in the remote queue Q11 becomes less than the threshold C.

The counter 411 counts the number of entries being used in the remote queue Q11 and outputs a count value CNTC. The counter 411 increments the count value CNTC by 1 when the signal Q11W from the remote queue Q11 becomes "1," and decreases the count value CNTC by 1 when the signal Q11R from the remote queue Q11 becomes "1." The threshold holding circuit 412 holds the threshold A, the threshold holding circuit 413 holds the threshold B, and the threshold holding circuit 414 holds the threshold C. Here, as illustrated in FIG. 3, the threshold A is the number of usable entries of the remote queue Q11 in the normal mode, the threshold B is the number of usable entries of the remote queue Q11 in the deadlock resolution mode, and the threshold C is the number of entries of the remote queue Q11 which corresponds to the condition for the shift from the deadlock resolution mode to the normal mode.

The comparison circuits 415 to 417 compare the count value CNTC output from the counter 411 and the thresholds A to C held by the threshold holding circuits 412 to 414 with each other, and output the comparison result. The comparison circuit 415 outputs "1" when the count value CNTC is equal to or larger than the threshold A, and outputs "0" when the count value CNTC is less than the threshold value A. The comparison circuit 416 outputs "1" when the count value CNTC is equal to or larger than the threshold B, and outputs "0" when the count value CNTC is less than the threshold B. In addition, the comparison circuit 417 outputs "1" when the count value CNTC is less than the threshold C, and outputs "0" when the count value CNTC is equal to or larger than the threshold value C.

According to the suppression signal QAS, the selector 418 outputs one of the outputs of the comparison circuits 415 and 416 as the busy signal BSYO. The selector 418 outputs the output of the comparison circuit 415 as the busy signal BSYO when the suppression signal QAS is "0," and outputs the output of the comparison circuit 416 as the busy signal BSYO when the suppression signal QAS is "1."

That is, in the normal mode, the result of the comparison between the count value CNTC and the threshold A is output as the busy signal BSYO. In the deadlock resolution mode, the result of the comparison between the count value CNTC and the threshold B is output as the busy signal BSYO. Accordingly, in the normal mode, when the number of entries used in the remote queue Q11 reaches the threshold A, the transmission of a request from another node of the previous stage to the own node is suppressed. In addition, in the deadlock resolution mode, when the number of entries used in the remote queue Q11 reaches the threshold B, the transmission of a request from another node of the previous stage to the own node is suppressed.

Figure 5:
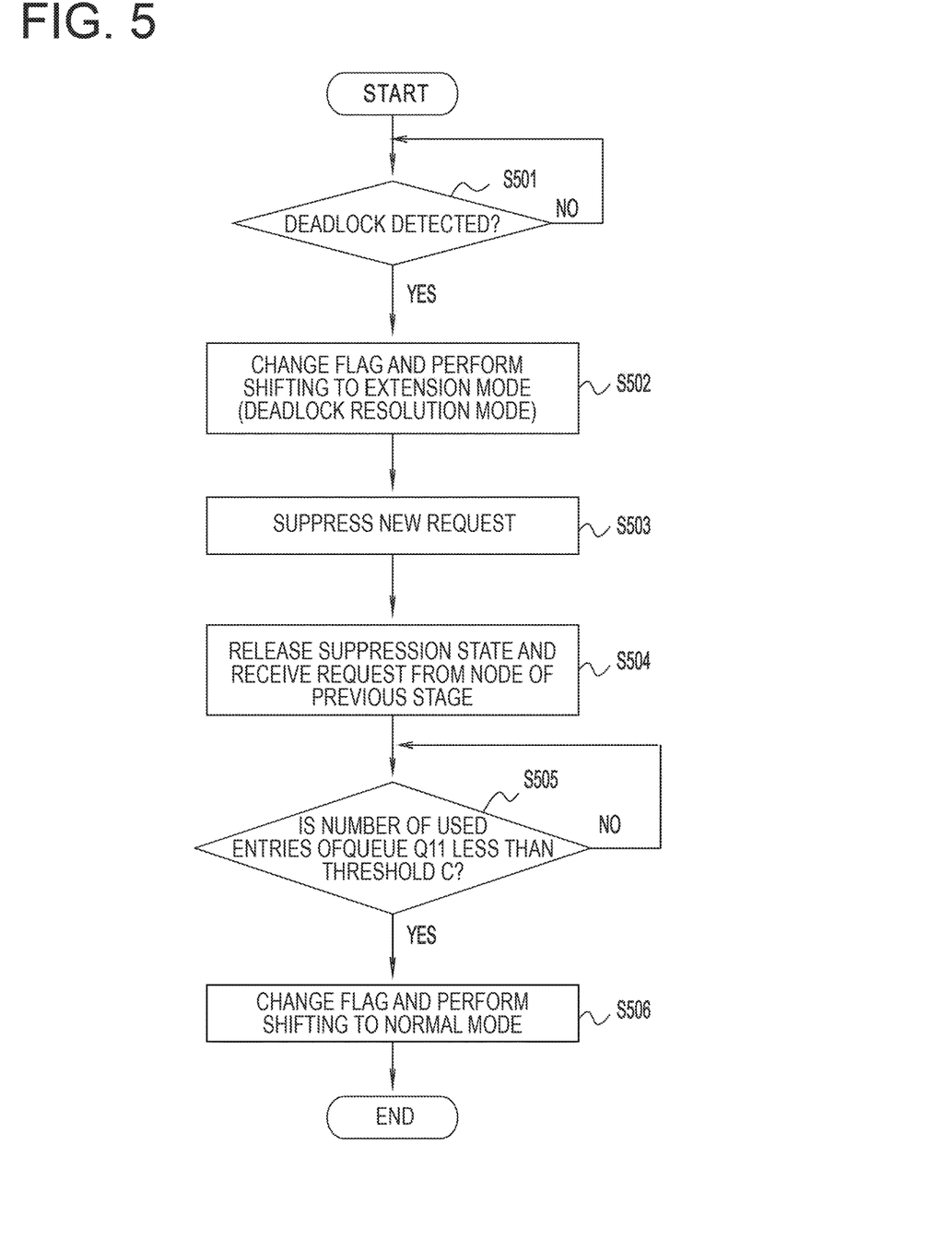
FIG. 5 is a flowchart illustrating an example of an operation of the deadlock controller according to the first embodiment.

Next, the operation of the deadlock controller 16 will be described with reference to FIG. 5. FIG. 5 is a flowchart illustrating an example of the operation of the deadlock controller 16. The deadlock controller 16 of each node 10 executes each of the operations illustrated in FIG. 5.

First, in operation S501, the deadlock controller 16 determines whether the deadlock state occurs. In the normal mode, when both the count values CNTA and CNTB of the counters 401 and 402 are larger than the threshold T, the deadlock controller 16 determines that the deadlock state occurs, and the operation proceeds to operation S502. That is, in the normal mode, when the busy signals BSYI and BSYO are continuously output for a longer time than the threshold T, the deadlock controller 16 determines that the remote queues Q11 of the own node and another node of the next stage are clogged, and thus, the deadlock state occurs.

Next, in operation S502, the deadlock controller 16 changes the flag that is held by the flag holding circuit 409 and indicates the deadlock resolution mode, to "1," and performs shifting to the deadlock resolution mode (entry extension mode). Subsequently, in operation S503, the deadlock controller 16 sets the suppression signal QAS to "1" so as to suppress the issuance of a new request from the own node to the ring bus, as a result of the change of the flag held by the flag holding circuit 409 to "1."

In addition, in operation S504, when the number of the usable entries in the remote queue Q11 increases (extends), the deadlock controller 16 sets the busy signal BSYO to "0" so as to release the state of suppressing the reception of a request via the ring bus and receive a request from another node of the previous stage. Then, in operation S505, the deadlock controller 16 waits until requests are sequentially processed and the number of entries used in the remote queue Q11 becomes less than the threshold C1. In operation S506, when the number of entries used in the remote queue Q11 becomes less than the threshold C, the deadlock controller 16 changes the flag held by the flag holding circuit 409 to "0," and performs shifting from the deadlock resolution mode to the normal mode.

Figure 6:
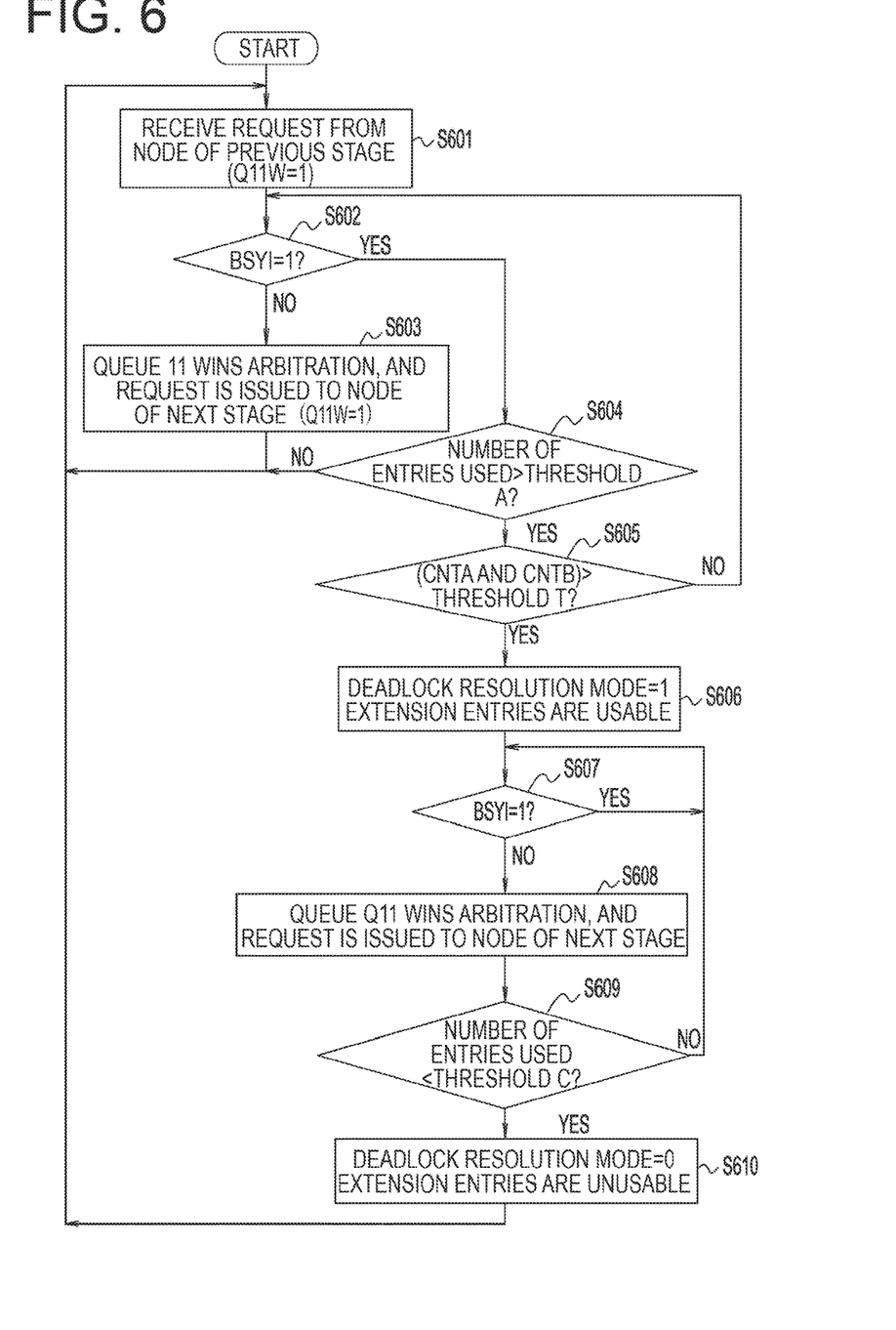
FIG. 6 is a flowchart illustrating an example of an operation of the node according to the first embodiment.

FIG. 6 is a flowchart illustrating an example of the operation of each node according to the first embodiment. FIG. 6 represents the operation of the node 10 when a request is transmitted via the ring bus RING.

In operation S601, when the crossbar unit (XB) 14 of the node 10 receives a request which is not addressed to the own node, from another node of the previous stage, the crossbar unit (XB) 14 stores the received request in the remote queue Q11. At this time, the signal Q11W output from the remote queue Q11 becomes "1," and the count value CNTC of the counter 411 of the deadlock controller 16 increases by 1.

Next, in operation S602, the crossbar unit (XB) 14 determines whether the busy signal BSYI input from another node of the next stage is "1." When it is determined that the busy signal BSYI is not "1," the crossbar unit (XB) 14 issues the request stored in the remote queue Q11 to another node of the next stage after the remote queue Q11 wins the arbitration in the arbitration unit 15, in operation S603. Then, the operation proceeds to operation S601. At this time, the signal Q11R output from the remote queue Q11 becomes "1," and the count value CNTC of the counter 411 of the deadlock controller 16 decreases by 1.

Meanwhile, as a result of the determination in operation S602, when it is determined that the busy signal BSYI is "1," the deadlock controller 16 determines whether the number of entries used in the remote queue Q11 is equal to or larger than the threshold A, in operation S604. As a result, when it is determined that the number of entries used in the remote queue Q11 is equal to or larger than the threshold A, the operation proceeds to operation S605, and otherwise, the operation returns to operation S601.

In operation S605, the deadlock controller 16 determines whether both the count values CNTA and CNTB of the counters 401 and 402 are larger than the threshold T. That is, the deadlock controller 16 determines whether the deadlock state occurs. As a result, when it is determined that at least one of the count values CNTA and CNTB of the counters 401 and 402 is equal to or less than the threshold T, that is, the deadlock state does not occur, the operation returns to operation S602.

Meanwhile, when it is determined that both the count values CNTA and CNTB of the counters 401 and 402 are larger than the threshold T, that is, the deadlock state occurs, the deadlock controller 16 changes the flag that is held by the flag holding circuit 409 and indicates the deadlock resolution mode, to "1." Accordingly, the deadlock controller 16 performs a shifting to the deadlock resolution mode and makes the extension entries 302 usable.

Next, in operation S607, the crossbar unit (XB) 14 determines whether the busy signal BSYI input from another node of the next stage is "1." When it is determined that the busy signal BSYI is not "1," the crossbar unit (XB) 14 issues the request stored in the remote queue Q11 to another node of the next stage after the remote queue Q11 wins the arbitration in the arbitration unit 15, in operation S608. At this time, the signal Q11R output from the remote queue Q11 becomes "1," and the count value CNTC of the counter 411 of the deadlock controller 16 decreases by 1.

Subsequently, in operation S609, the deadlock controller 16 determines whether the number of entries used in the remote queue Q11 is less than the threshold C. As a result, when it is determined that the number of entries used in the remote queue Q 11 is not less than the threshold, the operation returns to operation S607, and when it is determined that the number of used entries is less than the threshold, the operation proceeds to operation S610. In operation S 610, the deadlock controller 16 changes the flag that is held by the flag holding circuit 409 and indicates the deadlock resolution mode, to "0." Accordingly, the deadlock controller 16 performs a shifting to the normal mode and makes the extension entries 302 unusable. Then, the operation returns to operation S601.

According to the first embodiment, when it is determined that the deadlock state occurs, the deadlock controller 16 suppresses the issuance of a new request to the ring bus. In addition, when the number of usable entries in the remote queue Q11 increases, a request from the node of the previous stage may be received. As a result, requests stored in the remote queue Q11 of each node 10 may be circulated, and the deadlock state is resolved so that the occurrence of deadlock may be prevented.

Second Embodiment

Figure 7:
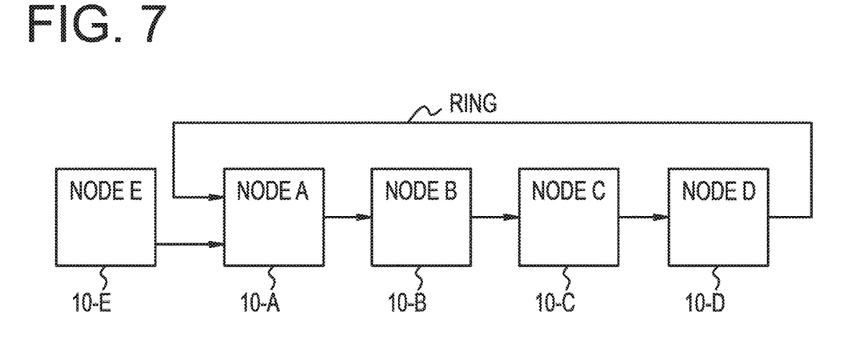
FIG. 7 is a diagram illustrating an example of a configuration of an information processing system according to a second embodiment.

Next, a second embodiment of the present disclosure will be described. FIG. 7 is a diagram illustrating an example of a configuration of an information processing system according to a second embodiment. In the information processing system according to the second embodiment, a plurality of nodes A 10-A to D 10-D are connected to each other via a ring bus RING connecting the plurality of nodes to each other in a ring shape, as in the first embodiment. Further, a node E 10-E is connected to the node A 10-A to issue a request from the outside the ring bus RING.

Figure 8:
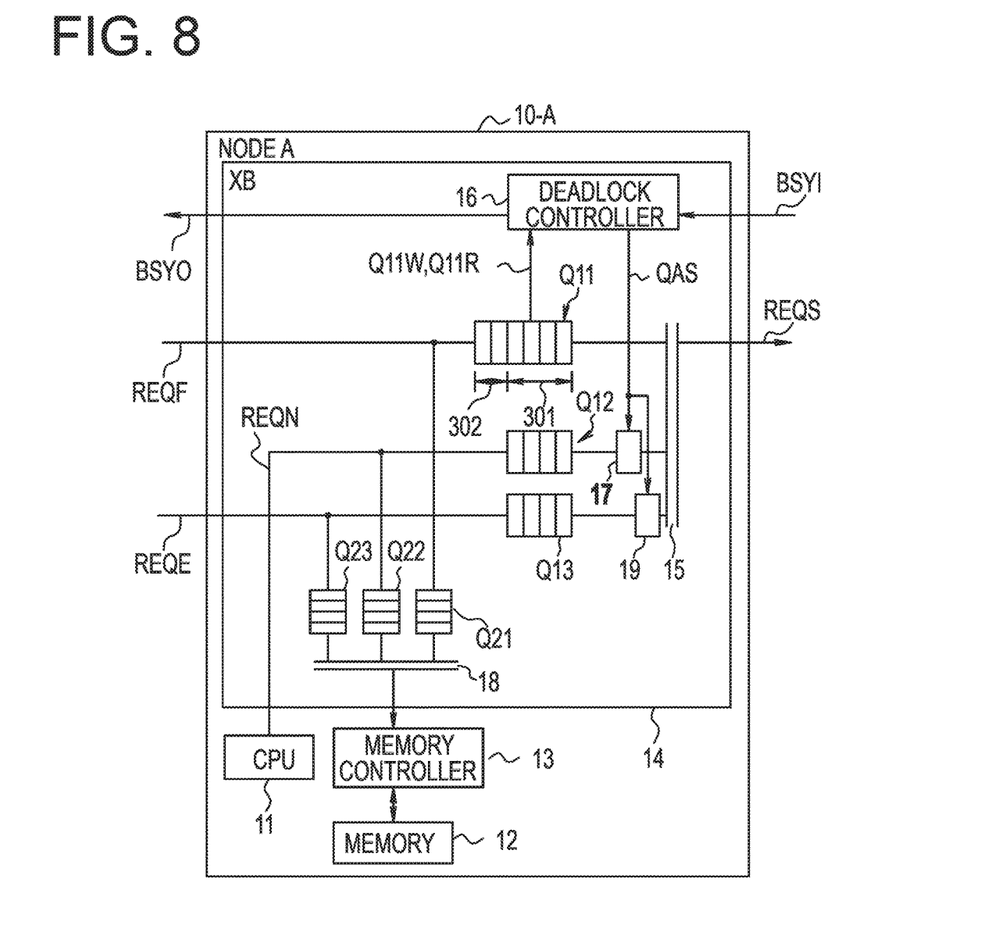
FIG. 8 is a view illustrating an example of a configuration of a node according to the second embodiment.

In addition, among the nodes A 10-A to E 10-E in the second embodiment, the configuration of the nodes B 10-B to E 10-E is the same as that of the nodes 10 in the first embodiment. Thus, the descriptions of the configuration of the nodes B 10-B to E 10-E will be omitted, and the node A 10-A in the second embodiment will be described. FIG. 8 is a diagram illustrating an example of the configuration of the node A 10-A in the second embodiment. In FIG. 8, the components having the same functions as those in FIG. 2 will be denoted by the same reference numerals as used in FIG. 2, and overlapping descriptions thereof will be omitted.

The node 10-A includes the CPU 11, the memory 12, the memory controller 13, and the crossbar unit (XB) 14. In addition, the crossbar part (XB) 14 includes two queues Q13 and Q23, in addition to the four queues (buffers) Q11, Q12, Q21, and Q22 each corresponding to a holding unit, the arbitration units (selectors) 15 and 18, the deadlock controller 16, and the suppression unit 17. Each of the queues Q13 and Q23 also has a plurality of entries.

The queue Q13 is a queue for storing a request addressed to another node within a request REQE received from the node E 10-E. The requests stored in the queues Q11 to Q13 are arbitrated in the arbitration unit 15, and then, transmitted as a request REQS to another node of the next stage. In addition, when the busy signal BSYI input from another node of the next stage is "1," the arbitration unit 15 suppresses the transmission of the requests to another node of the next stage.

In addition, the queue Q23 is a queue for storing a request to the memory 12 of the own node within the request REQE received from the node E 10-E. The requests stored in the queues Q21 to Q23 are arbitrated in the arbitration unit 18, and then, transmitted to the memory controller 13.

The suppression unit 19 controls the transmission of the request from the queue Q13 to the arbitration unit 15 according to the suppression signal QAS output from the deadlock controller 16. When the value of the suppression signal QAS is "1," the suppression unit 19 suppresses the transmission of the request from the local queue Q13 to the arbitration unit 15, and suppresses the issuance of a new request to the ring bus. That is, in the second embodiment, when the value of the suppression signal QAS is "1" (deadlock resolution mode), the transmission of the requests from the queues Q12 and Q13 to the arbitration unit 15 is restrained, and the issuance of a new request to the ring bus is suppressed.

According to the second embodiment, when it is determined that the deadlock state occurs, the request issued to the ring bus RING from the node E 10-E outside the ring bus RING is suppressed as a local request, like the request issued by the own CPU 11, so that the same effect as that in the first embodiment is obtained.

Third Embodiment

Figure 9:
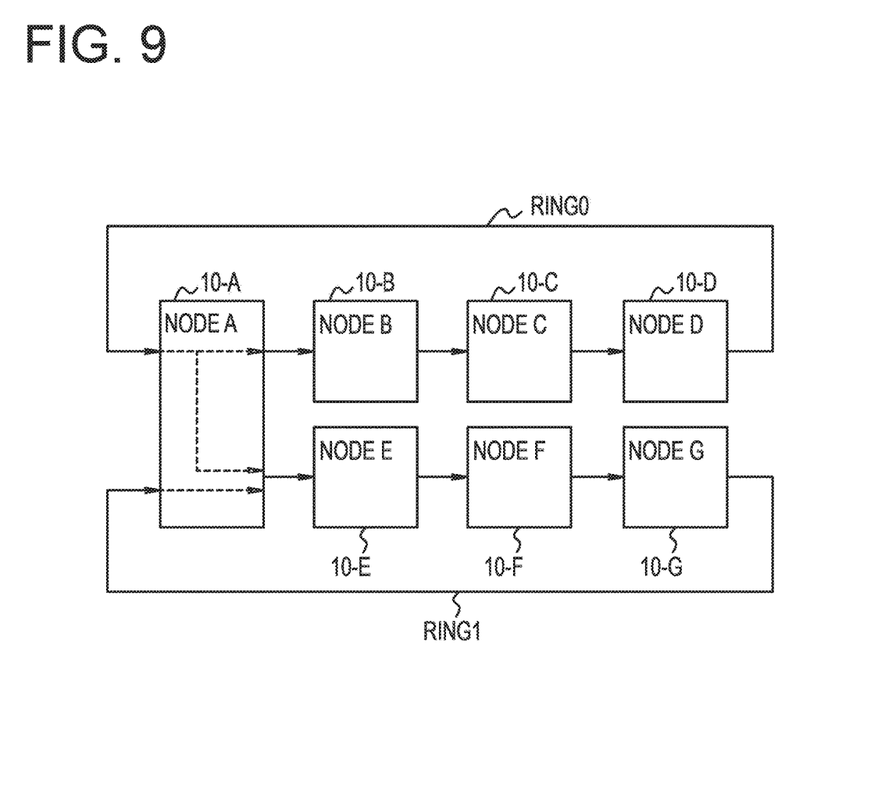
FIG. 9 is a diagram illustrating an example of a configuration of an information processing system according to a third embodiment.

Next, a third embodiment of the present disclosure will be described. FIG. 9 is a diagram illustrating an example of a configuration of an information processing system according to a third embodiment. In the information processing system according to the third embodiment, nodes A 10-A to D 10-D are connected to each other via a ring bus RING 0 connecting the plurality of nodes in a ring shape, and the node A 10-A and nodes E 10-E to G 10-G are connected to each other via a ring bus RING 1 different from the ring bus RING 0.

That is, in the information processing system according to the third embodiment, the node A 10-A is connected to the two ring buses RING 0 and RING 1. In addition, as indicated by dashed lines in FIG. 9, it is assumed that a request may be issued from the nodes A 10-A to D 10-D connected to the ring bus RING0 to the nodes E 10-E to G 10-G connected only to the ring bus RING 1, but a request may not be issued from the nodes E 10-E to G 10-G connected only to the ring bus RING 1 to the nodes B 10-B to D 10-D connected only to the ring bus RING 0.

Figure 10:
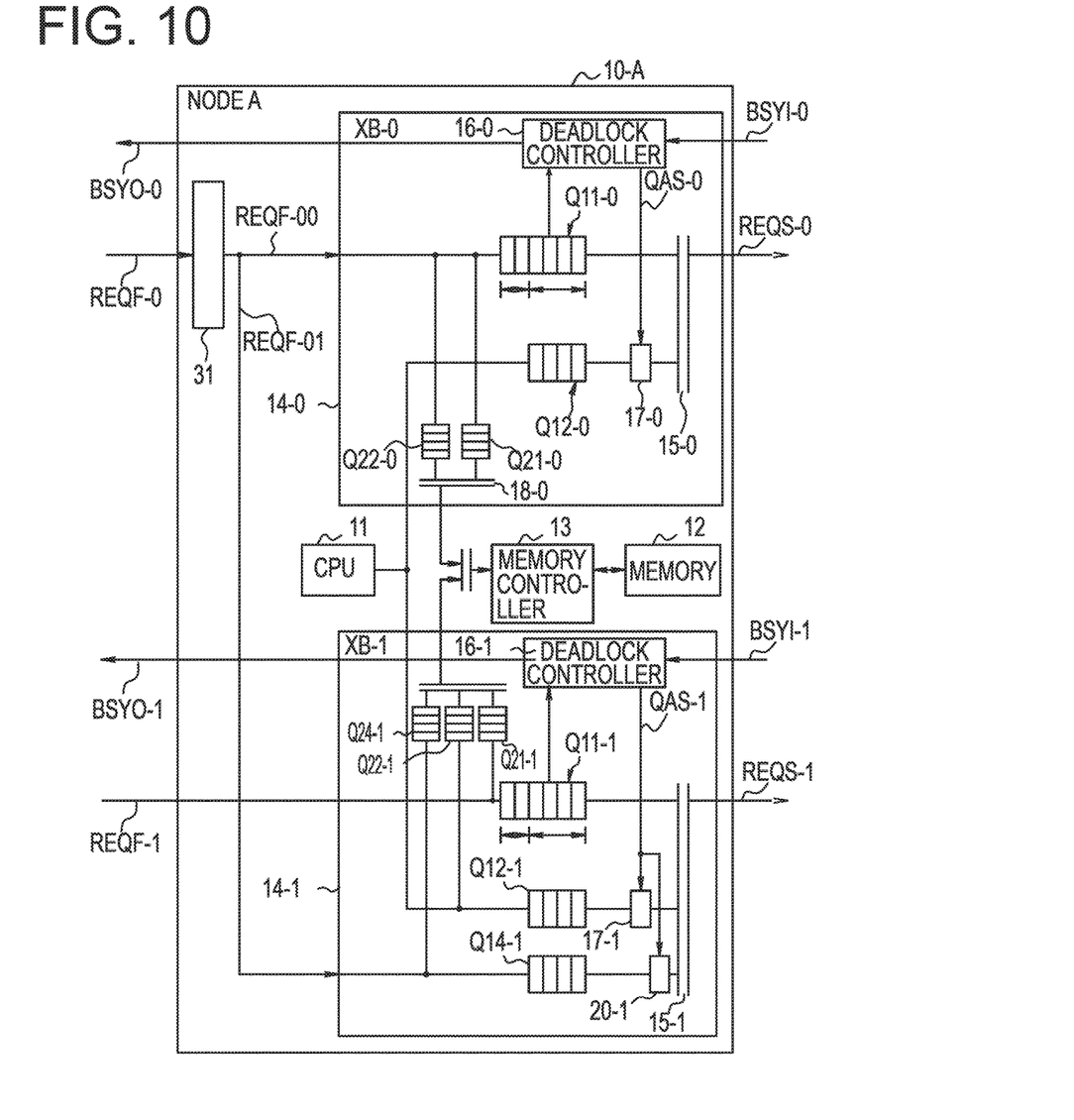
FIG. 10 is a view illustrating an example of a configuration of a node according to the third embodiment.

In addition, among the nodes A 10-A to G 10-G in the third embodiment, the configuration of the nodes B 10-B to G 10-G is the same as that of the nodes 10 in the first embodiment illustrated in FIG. 2. Thus, the descriptions of the configuration of the nodes B 10-B to G 10-G will be omitted, and the node A 10-A in the third embodiment will be described. FIG. 10 is a diagram illustrating an example of the configuration of the node A 10-A according to the third embodiment. In FIG. 10, the components having the same functions as those in FIGS. 2 and 8 will be denoted by the same reference numerals as used in FIGS. 2 and 8, and overlapping descriptions thereof will be omitted. In addition, in FIG. 10, a component ended with the suffix "0" indicates a component related to the ring bus RING 0, and a component ended with the suffix "1" indicates a component related to the ring bus RING 1.

The node 10-A includes the CPU 11, the memory 12, the memory controller 13, crossbar units (XB) 14-0 and 14-1, and a transmission unit 31. The crossbar unit (XB) 14-0 has the same configuration as that of the crossbar unit (XB) 14 of the node 10 illustrated in FIG. 2, and processes a request transmitted via the ring bus RING 0. The crossbar part (XB) 14-1 includes queues Q14 and Q24, instead of the queues Q13 and Q23, has the same configuration as that of the crossbar part (XB) 14 of the node 10-A illustrated in FIG. 8, and processes a request transmitted via the ring bus RING 1.

The transmission unit 31 transmits a request REQF-0 input via the ring bus RING 0 to one of the ring bus RING 0 and the ring bus RING 1 based on reception destination (issuance destination) information in the request. When the input request REQF-0 is a request addressed to a node connected to the ring bus RING 0, the transmission unit 31 outputs the request as a request REQF-00 from another node, to the crossbar unit (XB) 14-0. In addition, when the input request REQF-0 is a request addressed to a node connected to the ring bus RING 1, the transmission unit 31 outputs the request as a request REQF-01 from another node, to the crossbar unit (XB) 14-1.

According to the third embodiment, the request addressed to the node connected to the ring bus RING 0 is processed in the same manner as described in the first embodiment, and the request addressed to the node connected to the ring bus RING 1 from the node connected to the ring bus RING 0 is processed as a local request as in the second embodiment. Thus, the requests to other nodes may be sequentially processed, and the occurrence of the deadlock may be prevented.

In addition, the embodiments described above are merely examples for implementing the present disclosure, and the technical scope of the present disclosure may not be interpreted to be limited to the embodiments. That is, the present disclosure may be implemented in various forms without departing from the technical idea or the main features of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus as a first information processing apparatus of a plurality of information processing apparatuses configured to form a ring-shaped bus, the information processing apparatus comprising:
   a first buffer configured to have entries to store a first request data that is received through the ring-shaped bus and transmitted to a second information processing apparatus of the plurality of information processing apparatuses through the ring-shaped bus;
a memory; and
a processor coupled to the memory and the processor configured to:
transmit, to the second information processing apparatus, the first request data stored in the entries of the first buffer and a second request data to be transmitted to the second information processing apparatus or a third information processing apparatus of the plurality of information processing apparatuses;
when a state where a number of entries in which data is stored in the first buffer is equal to or larger than a first threshold is continued for a time longer than a first time, and a state where transmissions of the first request data and the second request data to the second information processing apparatus are suppressed is continued for a time longer than a second time, change a number of entries usable in the first buffer into a second threshold larger than the first threshold; and
when the number of entries usable in the first buffer is the second threshold, suppress a transmission of the second request data to the ring-shaped bus.

2. The information processing apparatus according to claim 1, wherein when the number of entries usable in the first buffer is the second threshold, and the number of entries in which data is stored in the first buffer becomes less than a third threshold smaller than the first threshold, the processor is configured to change the number of entries usable in the first buffer to the first threshold.

3. The information processing apparatus according to claim 1, wherein the processor is further configured to:
store the second request data in a second buffer having entries to store the second request data that is received through the ring-shaped bus and transmitted to the second information processing apparatus through the ring-shaped bus, and
suppress the transmission of the second request data from the second buffer.

4. The information processing apparatus according to claim 1, wherein when the number of entries in which data is stored in the first buffer is equal to or larger than the number of entries usable in the first buffer, the processor is configured to suppress the transmission of the first request data or the second request data from an information processing apparatus of a previous stage to the first information processing apparatus.

5. The information processing apparatus according to claim 1, wherein the processor is further configured to:
issue the second request data; and
perform a processing according to the first request data and the second request data which are addressed to the first information processing apparatus.

6. An information processing system comprising:
a plurality of information processing apparatuses configured to form a first ring-shaped bus, an information processing apparatus as a first information processing apparatus of the plurality of information processing apparatuses configured to include:
a first buffer configured to have entries to store a first request data that is received through the first ring-shaped bus and transmitted to a second information processing apparatus of the plurality of information processing apparatuses through the first ring-shaped bus;
a memory; and
a processor coupled to the memory and the processor configured to:
transmit, to the second information processing apparatus, the first request data stored in the entries of the first buffer and a second request data to be transmitted to the second information processing apparatus or a third information processing apparatus of the plurality of information processing apparatuses;
when a state where a number of entries in which data is stored in the first buffer is equal to or larger than a first threshold is continued for a time longer than a first time, and a state where transmissions of the first request data and the second request data to the second information processing apparatus are suppressed is continued for a time longer than a second time, change a number of entries usable in the first buffer into a second threshold larger than the first threshold; and
when the number of entries usable in the first buffer is the second threshold, suppress a transmission of the second request data to the first ring-shaped bus.

7. The information processing system according to claim 6, further comprising:
an information processing apparatus arranged outside the first ring-shaped bus and coupled to anyone of the plurality of information processing apparatuses forming the first ring-shaped bus,
wherein when the number of entries usable in the first buffer is the second threshold, the processor of the first information processing apparatuses is configured to suppress transmissions of the second request data and a third request data received from the information processing apparatus arranged outside the first ring-shaped bus.

8. The information processing system according to claim 6, further comprising:
a plurality of information processing apparatuses configured to form a second ring-shaped bus different from the first ring-shaped bus,
wherein a third request data is issued from an information processing apparatus forming the first ring-shaped bus to an information processing apparatus forming the second ring-shaped bus, and
wherein a processor included in an information processing apparatus forming the first ring-shaped bus and the second ring-shaped bus is configured to suppress a transmission of the second request data and the third request data received from the information processing apparatus forming the first ring-shaped bus, to the information processing apparatus forming the second ring-shaped bus, when the number of entries usable in the first buffer included in the information processing apparatus forming the second ring-shaped bus is the second threshold.

9. A method of controlling an information processing apparatus as a first information processing apparatus of a plurality of information processing apparatuses configured to form a ring-shaped bus, the method comprising:
storing a first request data that is received through the ring-shaped bus and transmitted to a second information processing apparatus of the plurality of information processing apparatuses through the ring-shaped bus, in a first buffer;
transmitting, to the second information processing apparatus, the first request data stored in the entries of the first buffer and a second request data to be transmitted to the second information processing apparatus or a third information processing apparatus of the plurality of information processing apparatuses;

changing a number of entries usable in the first buffer into a second threshold larger than the first threshold, when a state where a number of entries in which data is stored in the first buffer is equal to or larger than a first threshold is continued for a time longer than a first time, and a state where transmissions of the first request data and the second request data to the second information processing apparatus are suppressed is continued for a time longer than a second time; and suppressing a transmission of the second request data to the ring-shaped bus, when the number of entries usable in the first buffer is the second threshold, by a processor.

* * * * *